(12) United States Patent
Masumoto et al.

(10) Patent No.: US 6,256,359 B1
(45) Date of Patent: Jul. 3, 2001

(54) RDS SIGNAL DETECTION DEVICE

(75) Inventors: Takahiko Masumoto, Gunma-ken; Kazuhiro Kimura, Fukaya; Hiroshi Kaneko, Gunma-ken, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/840,988

(22) Filed: Apr. 21, 1997

(30) Foreign Application Priority Data

Apr. 22, 1996 (JP) ................................................ 8-100366

(51) Int. Cl.[7] .............................. H04L 5/12; H03D 3/00
(52) U.S. Cl. ..................... 375/333; 375/324; 375/361; 375/340; 329/304; 329/345
(58) Field of Search ..................... 375/224, 226, 375/282, 324, 326, 333, 340, 361; 341/70, 71; 329/304, 305–310, 345, 346

(56) References Cited

U.S. PATENT DOCUMENTS

| | | | | |
|---|---|---|---|---|
| 4,361,895 | * | 11/1982 | Khoudari | 375/333 |
| 4,862,513 | * | 8/1989 | Bragas | 455/45 |
| 5,001,728 | | 3/1991 | Fuldner . | |
| 5,175,507 | * | 12/1992 | Roither | 329/304 |
| 5,200,980 | | 4/1993 | Briddell . | |
| 5,399,987 | * | 3/1995 | Yamamoto et al. | 329/306 |
| 5,414,384 | * | 5/1995 | Hegeler | 329/304 |
| 5,661,761 | * | 8/1997 | Iwamatsu | 375/344 |
| 5,745,845 | * | 4/1998 | Suenaga et al. | 455/194.1 |
| 5,777,511 | * | 7/1998 | Masumoto et al. | 329/304 |
| 5,778,031 | * | 7/1998 | Hiramatsu | 375/333 |
| 5,867,533 | * | 2/1999 | Fleek et al. | 375/279 |
| 6,038,434 | * | 3/2000 | Miyake | 455/186.1 |
| 6,118,831 | * | 9/2000 | Masumoto et al. | 375/340 |

FOREIGN PATENT DOCUMENTS

| | | |
|---|---|---|
| 0717517 | 6/1996 | (EP) . |
| 8037543 | 2/1996 | (JP) . |
| 08084161 | 3/1996 | (JP) . |

* cited by examiner

*Primary Examiner*—Young T. Tse
(74) *Attorney, Agent, or Firm*—Hogan & Hartson L.L.P.

(57) ABSTRACT

Received signals are digitized by a comparator, and sampled by regenerated clock signals synchronized to a carrier. Biphase symbol data are demodulated based on the sampling data. A biphase decoder circuit performs subtraction of the biphase symbol data to be paired. The subtraction result is compared with threshold values by data judgment circuitry which then judges inversion of the biphase signals to be paired. An RDS-ID detector circuit detects inversion of RDS signals by detection of either continuity or a ratio of signals received for a certain length period. Alternatively, RDS signals are detected by stability of output from the pair judgment circuit to detect a combination of biphase symbols.

12 Claims, 8 Drawing Sheets

RDS SIGNAL DETECTION DEVICE

BACKGROUND OF THE INVENTION

1. Field of the Invention

The present invention relates to a Radio Data System (RDS) signal detection device incorporated in a device to receive and demodulate RDS broadcasting signals, which judges whether signals received are RDS signals or not.

2. Description of the Prior Art

In an RDS broadcast mainly broadcast in Europe, automatic reception control of broadcasting stations which broadcast the same programs is performed using Alternative Frequency (AF) codes contained in data transmitted. In this case, it is necessary to search for a station having the best reception among stations listed in an AF code list and broadcasting the same program. It is also necessary to switch to the selected station as soon as possible. Therefore, selection of the best reception station has been conventionally performed by detecting the strength of reception electric field at each station while output sounds are muted for a very brief duration that is not uncomfortable for listeners so that a reception station is switched to an AF station.

In reception control as described above, the reception station selected according to the AF code can be a non-RDS station, or reception sensitivity of the station is sometimes not good enough to receive RDS data. In cases like these, a Program Identification code (PI code) for judging whether the station selected is a station to broadcast the same program is not detected, and as a consequence selection of a proper station is not performed. Therefore, re-selection of a station on the AF list having a second best strength of reception electric field is performed. For a quicker, more accurate selection, it is necessary to judge, as soon as possible, whether a station switched to is an RDS station or not. Likewise, if only RDS stations are sought and selected or memorized, it is necessary to judge, as soon as possible, whether the station selected is an RDS station or not.

A judging action of an RDS station such as that described above has conventionally been performed by detecting block synchronization or group synchronization of RDS data after broadcasting signal reception has been started by the selected station which was assumed to be an AF station.

The RDS data is configured in blocks of 26 bits. A certain synchronization pattern (offset words) is added to each block. Block synchronization is established by detecting the periodicity of the patterns. One group is configured in four blocks, and group synchronization is established by judging an order of offset words. Conventionally, at least 44 msec, which is equivalent to the length of two blocks, was necessary, since synchronization establishment of RDS data was used to judge an RDS station. Depending on reception conditions, about 200 msec is necessary for judgment because more than 100 msec is necessary for synchronization establishment. Therefore, switching of reception stations may be delayed, or listeners may feel uncomfortable due to a long muting period.

SUMMARY OF THE INVENTION

RDS signals are differentially coded and then biphase coded to suppress power of signals with closer carrier frequencies. In biphase coding, for example, a signal of data 1 is expressed by (1,0), and (0,1) is for a signal of 0. Therefore, one symbol is converted and coded into two symbols. The amplitudes of the carrier frequency signals are modulated by the biphase coding signals. They are then multiplexed into FM base band signals and become actual broadcasting waves.

The present invention takes advantage of the RDS signals which are biphased, and judges whether received signals are RDS signals or not by detecting the existence of pairs of coded symbols within the received signals.

In other words, the present invention distinguishes RDS signals by first detecting inversion of signals within a biphase symbol pair and then by detecting continuity or a ratio of inversion for a certain duration. Another method of RDS signal judgment is to detect, using the same method as described above, stability of output from a pair judgment circuit which detects a combination of biphase symbols.

As described above, it is possible to distinguish an RDS station, before synchronization detection of RDS data, for a much shorter time (e.g., 20 msec) by detecting RDS signals using a demodulator using a characteristic of biphase signals.

DESCRIPTION OF THE PREFERRED EMBODIMENT

Figure 1:
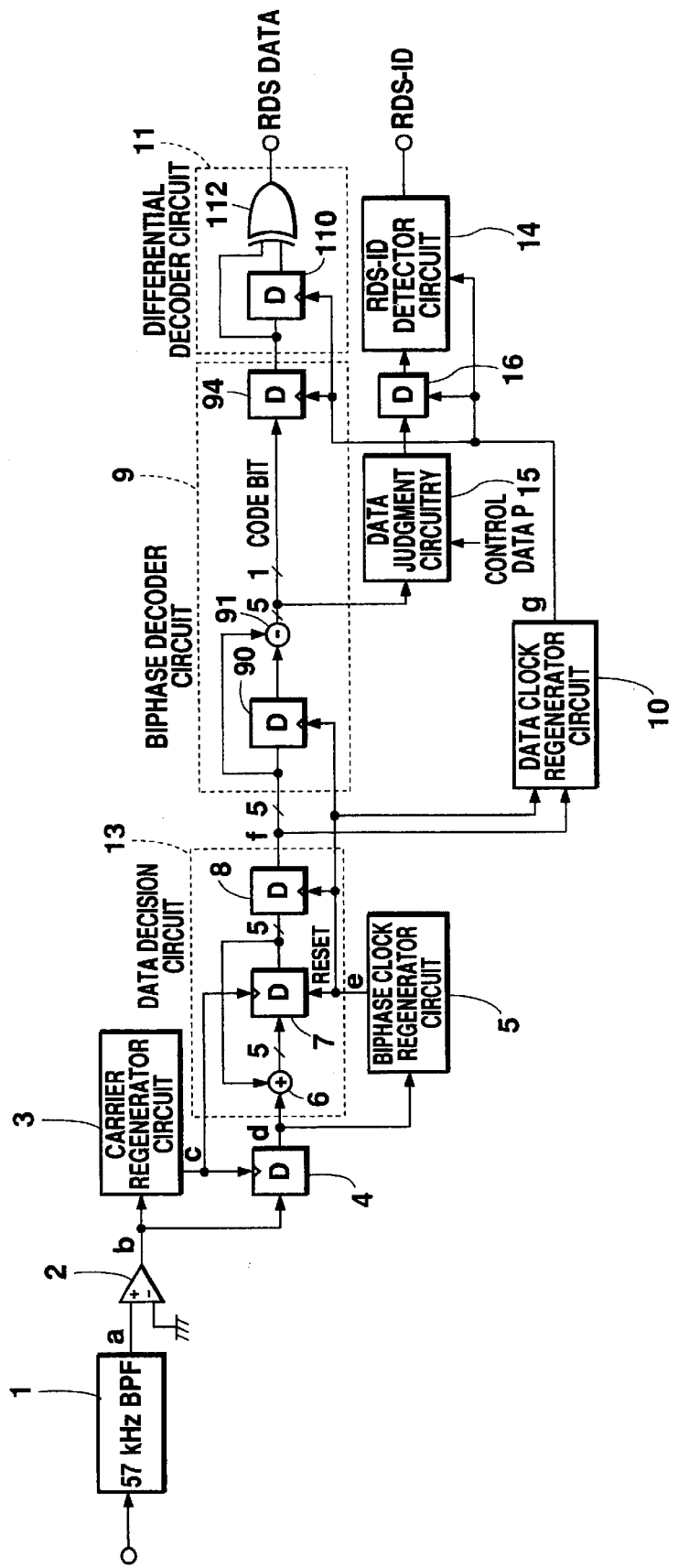
FIG. 1 is a block diagram showing an embodiment of a configuration of a data decision circuit of the present invention.

FIG. 1 is a block diagram of an RDS demodulator related to the present invention.

FM composite signals in which RDS signals are multiplexed are supplied to a 57 KHz-BPF circuit 1. RDS signals are then separated by the 57 KHZ-BPF circuit 1, and supplied to a comparator 2 where the RDS signals are digitized into 0 or 1. Output from the comparator is supplied to both a carrier regenerator circuit 3 and a D flip-flop (hereafter called D-FF) 4 which is a phase detector circuit. On the other hand, clock signals synchronizing a carrier of 57 KHz are regenerated at the carrier regenerator circuit 3. Based on the regenerated clock signals, D-FF 4 samples the output from the comparator 2.

Figure 6:
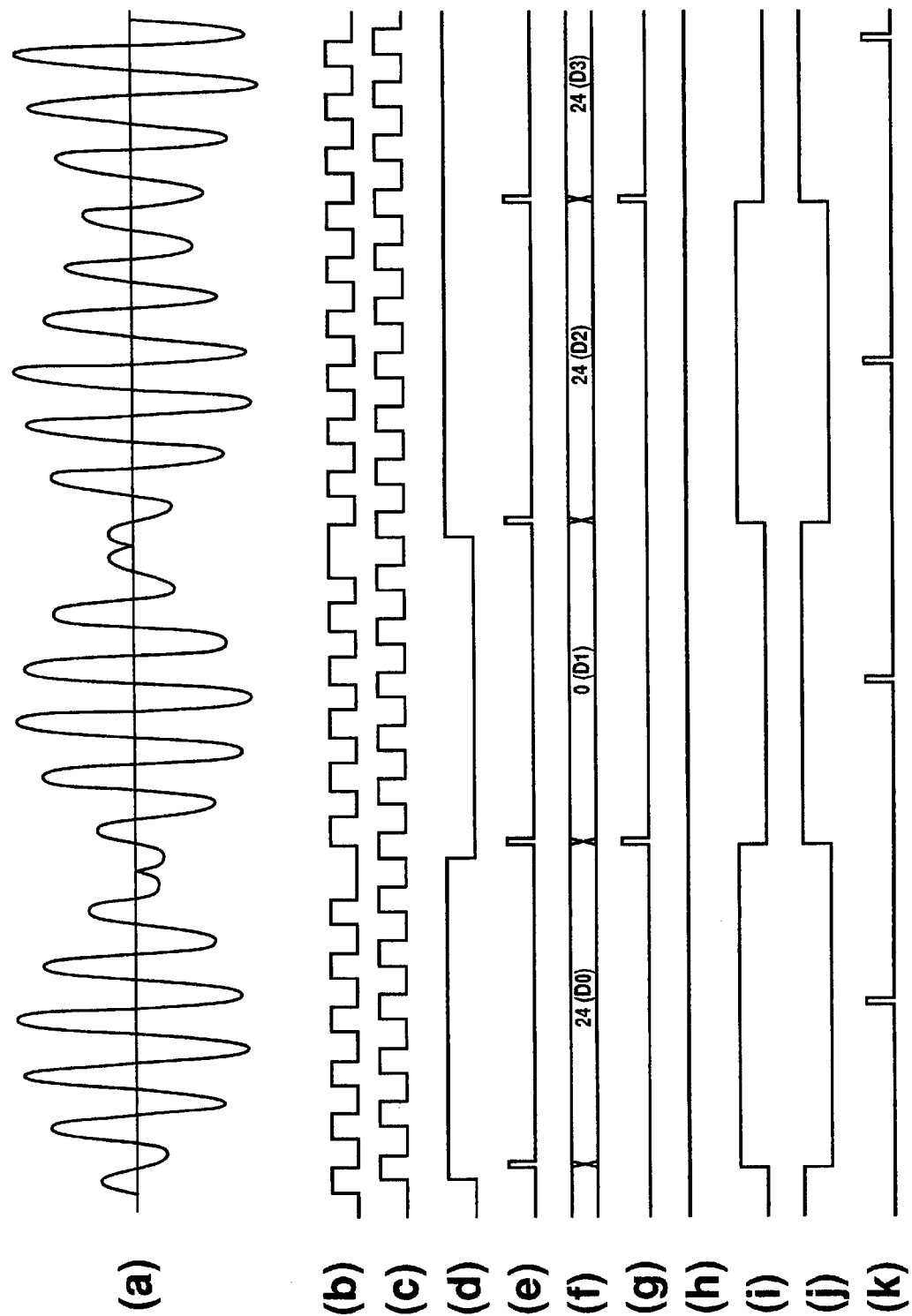
FIG. 6 is a timing chart explaining actions described in the embodiment of the present invention.

FIG. 6 shows waveforms of signals. As a BPF output, RDS signals of FIG. 6(a) are output. Digital signals (b) are output from the comparator 2. Clock signals of 57 KHz regenerated by the carrier regenerator circuit 3 are supplied to the D-FF4 on timings shown in (c) (with 90° of phase shift from carrier signals). As a consequence, signals shown in (d) are obtained as the sampling output from the D-FF 4. These signals (d) are supplied to both a biphase clock regenerator circuit 5 and a data decision circuit 13. In the biphase clock regenerator circuit 5, clock pulses at a biphase symbol rate shown in (e) are regenerated. In the data decision circuit 13, an adder 6 adds output from a D-FF 7 which the output of the adder 6 is supplied with, and output from the D-FF 4 shown in (d). The D-FF 7 is reset by the clock pulses at the biphase symbol rate shown in (e). The D-FF 7 and the adder 6 form an accumulator. The sampling output data from the D-FF 4 are accumulated by the accumulator for one symbol period. More specifically, the number of "1"s in the sampling output data is accumulated.

If the sampling data are ideal, signals of 24 carriers during one symbol period are input in the case of RDS signals. Therefore, the accumulation by the adder should result in 24 or 0 (6 or 0 in FIG. 6). A D-FF 8 latches the accumulation result using the clock pulses shown in (e) at the biphase symbol rate. The latched result is input into both a biphase decoder circuit 9 and a data clock regenerator circuit 10.

The biphase decoder circuit 9 includes both a D-FF 90 which delays the output from the D-FF8 by one biphase period using the clock pulses (e) at the biphase symbol rate, and a subtraction circuit 91 which subtracts the output of the D-FF8 from the output of the D-FF 90. A differential process is performed between neighboring biphase symbol data by both the D-FF 90 and the subtraction circuit 91. The differentially coded bit is supplied to a D-FF 94 as differentially coded RDS data. The biphase symbol data are expressed as (1,0) for source data of 1, and as (0,1) for source data of 0. Therefore, if the differential result is positive, then the differentially coded RDS data is 1. If the differential result is negative, then the differentially coded RDS data is 0.

The differential result from the subtraction circuit 91 is also supplied to a data judgment circuitry 15 where an absolute value of the differential result is compared with control data P of an external source. If ideal, noise-free RDS signals are input, the differential result from the subtraction circuit 91 between the neighboring biphase symbol data should be 24−0=24 or 0−24=−24. The differential result should be large in this case even if there is only a minor effect due to noise or the like. On the other hand, if the input signals are not RDS signals, the differential result should be smaller due to the fact that the signals were not biphase coded. Therefore, in the data judgment circuitry 15, if the differential result falls within a range from −5 to +5, assuming that the control data P is ±5 for example, the input signals are judged not to be biphase coded signals, in other words, not to be RDS signals. The data judgment circuitry 15 then outputs 0 as judgment data. If the differential result does not fall within the previous range, then the data judgment circuitry 15 judges the input signals to be biphase coded RDS signals, and outputs 1 as the judgment data.

The data clock regenerator circuit 10 judges pairs of biphase symbol data based on the output from the D-FF8. At timings of every other symbol to be paired, the data clock regenerator circuit 10 then separates clock signals from biphase clock signals which were regenerated at each symbol. The data clock regenerator circuit 10 then supplies these clock signals to both D-FFs 94, 16 and also to a differential decoder circuit 11 as data clock signals shown in (g). Therefore, differentially coded RDS data outputted from the subtraction circuit 91 and the judgment data from the data judgment circuitry 15 are latched into D-FFs 94 and 16 at every two biphase symbols constituting a pair.

The differentially coded RDS data latched into the D-FF 94 are supplied to a differential decoder circuit 11. Consecutive differentially coded RDS data are decoded into RDS source data by a D-FF 110 and an EXOR circuit 112, and then supplied to a later-described synchronization regenerator circuit where synchronization is established based on the RDS source data. The judgment data latched into the D-FF 16 are supplied to an RDS-ID detector circuit 14 where the signals input are examined to see whether they are RDS signals or not using the judgment data.

In the embodiment described above, the accumulator (the adder 6 and the D-FF 7) which simply accumulates sampling data for one symbol period is used in the data decision circuit 13 to obtain an accumulation result of the sampling output. A low-pass filter can be substituted for the accumulator, however.

Figure 2:
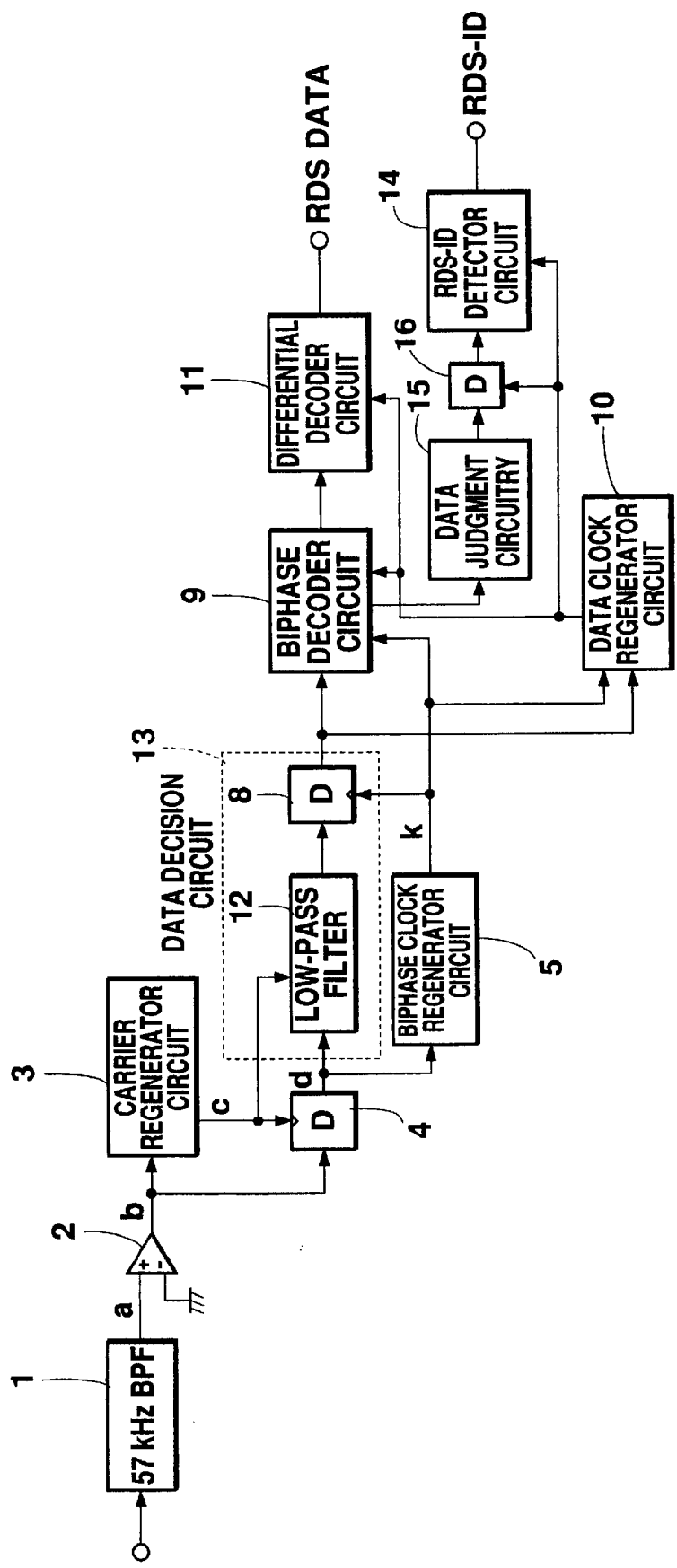
FIG. 2 is a block diagram showing another configuration of a data decision circuit.

As shown in FIG. 2, a digital low-pass filter 12 of 2375 KHz pass band which is the RDS biphase symbol rate is provided instead of the adder 6 and the D-FF 7. Sampling output from the D-FF 4 is supplied to the low-pass filter 12. The biphase clock regenerator circuit 5 is constructed so that clock signals at the biphase symbol rate as shown in (k) are generated at about a midpoint of each symbol period. The biphase clock signals (k) are supplied to a clock terminal of the D-FF 8, and the D-FF 8 latches output from the digital low-pass filter 12. If decimal places obtained by filtering calculation are output as latch output from the D-FF 8, a plurality of bits including decimal places are obtained as the output. In other words, the latch output should be 1.00 or 0.00 if the input signals are ideal ones free of noise. If waveforms of the input signals are distorted due to noise or the like, then latch output of about 0.50 should be obtained. The latch output is supplied to both the biphase decoder circuit 9 and the data clock regenerator circuit 10, as previously described. The biphase decoder circuit 9 performs differential calculation between biphase symbol data forming a pair. If the differential result is positive, then differentially coded RDS data become 1. If the differential result is negative, then differentially coded RDS data become 0. If ideal noise-free RDS data are input into the biphase decoder circuit 9, then the differential result should become 1.00−0.00=+1 or 0.00−1.00=−1.00. Even if effects caused by noise are present, the differential result should be large. On the other hand, if the input signals are not RDS signals, then the differential result should take a smaller value due to the fact that the input signals were not biphase coded. Therefore, a threshold value of the data judgment circuitry 15 is set to be ±0.3. If the differential result falls within a range from −0.3 to +0.3, then the input signals are not RDS signals, and judgment data 0 is supplied. If the differential result does not fall within the previous range, then the input signals are judged to be RDS signals, and judgment data 1 is supplied.

The differentially coded RDS data and the judgment data obtained as described above are respectively supplied to the differential decoder circuit 11 and the RDS-ID detection circuit 14 where RDS source data and RDS-ID signals are respectively outputted.

Figure 3:
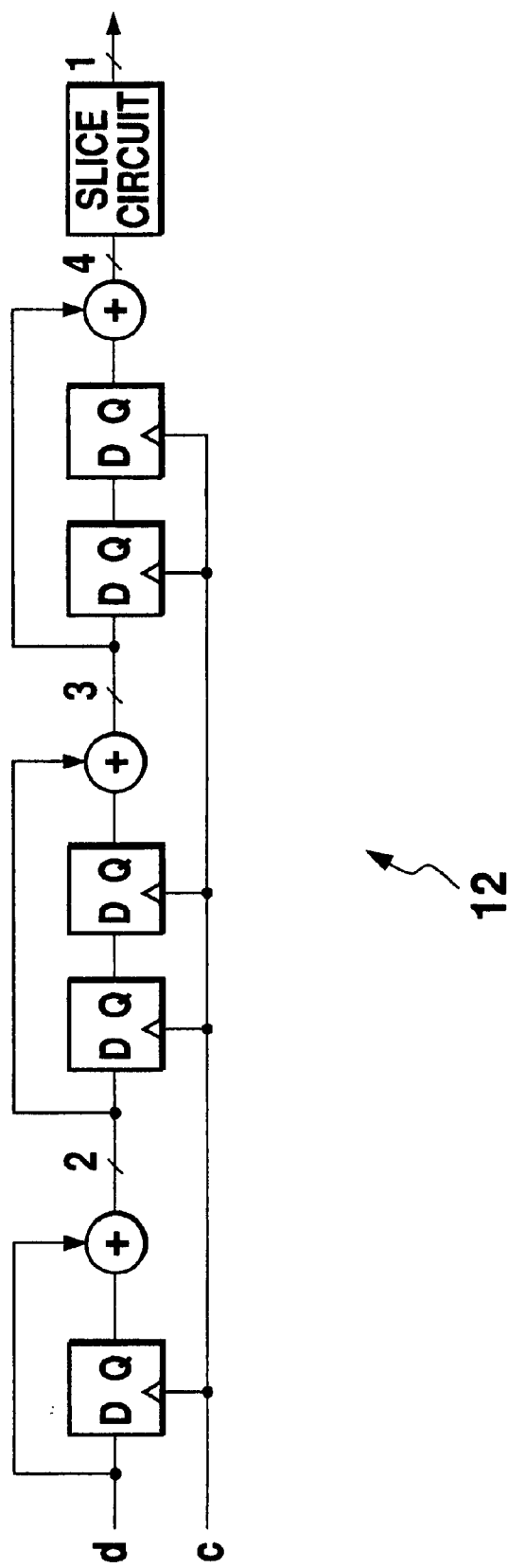
FIG. 3 is a circuit diagram showing a configuration of a low-pass filter.

As the digital low-pass filter 12, a circuit shown in FIG. 3 which comprises a plurality of delay circuits and a slice circuit can be used. The latch timing of the filter output is set to be about a midpoint of each symbol period, because the filter output is maximized around these timings. Specifically, it is preferable to delay each latch timing by a delay caused by the filter.

A configuration of the data clock regenerator circuit 10 will now be explained.

Figure 4:
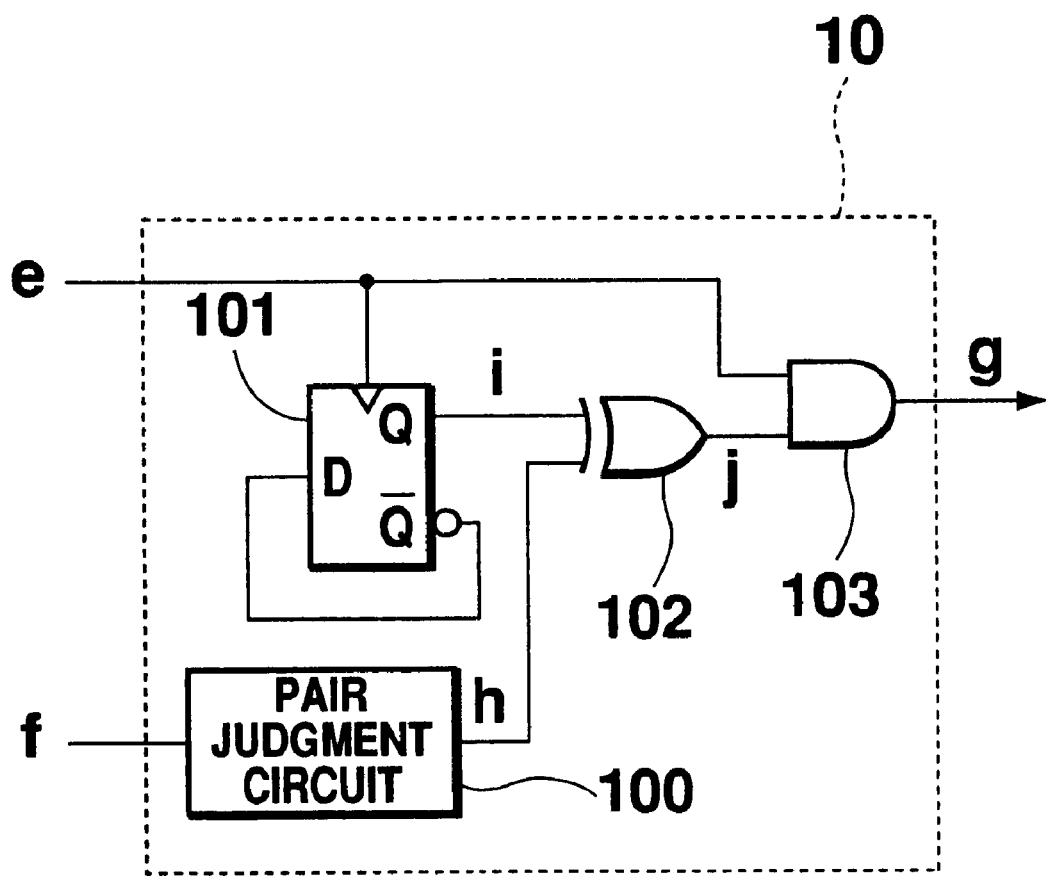
FIG. 4 is a block diagram showing a configuration of a data clock regenerator circuit.

In the data clock regenerator circuit 10, the output from the D-FF 8 is supplied to a pair judgment circuit 100 as shown in FIG. 4. The pair judgment circuit 100 judges timings to be paired using, for example, three consecutive biphase symbol data, and supplies a judgment result to an EXOR 102. Signals obtained by dividing the biphase clock pulses (e) into two using a divider 101 are also supplied to the EXOR circuit 102. After the EXOR circuit 102 supplies output to an AND circuit 103, the AND circuit 103 separates timings to be paired at every other symbol from the biphase clock signals (e) which were regenerated at every symbol. The separated clocks are supplied as data clocks shown in (g).

More specifically, in the timing chart depicted in FIG. 6, biphase clock signals (e) were divided into two and output as signals shown in (i). When the pair judgment circuit 100 outputs signals depicted in (h), i.e., 1, the EXOR circuit 102 outputs signals depicted in (j) which are inversions of (i). The AND circuit 103 outputs the clock signals (g) at timings of every other symbol. The pair judgment circuit 100 judges pairs of biphase symbol data based on the output (f) from the D-FF 8. The pair judgment circuit 100 outputs the signals depicted in (h) which are at level 1 in the case of biphase symbol data being paired as (D1, D2), (D3, D4) . . . The pair judgment circuit outputs the signals depicted in (h) which are at level 0 in the case of biphase symbol data being paired as (D0, D1), (D2, D3) . . . In FIG. 6, the case of biphase symbol data being paired as (D1,D2) . . . is shown.

Figure 5:
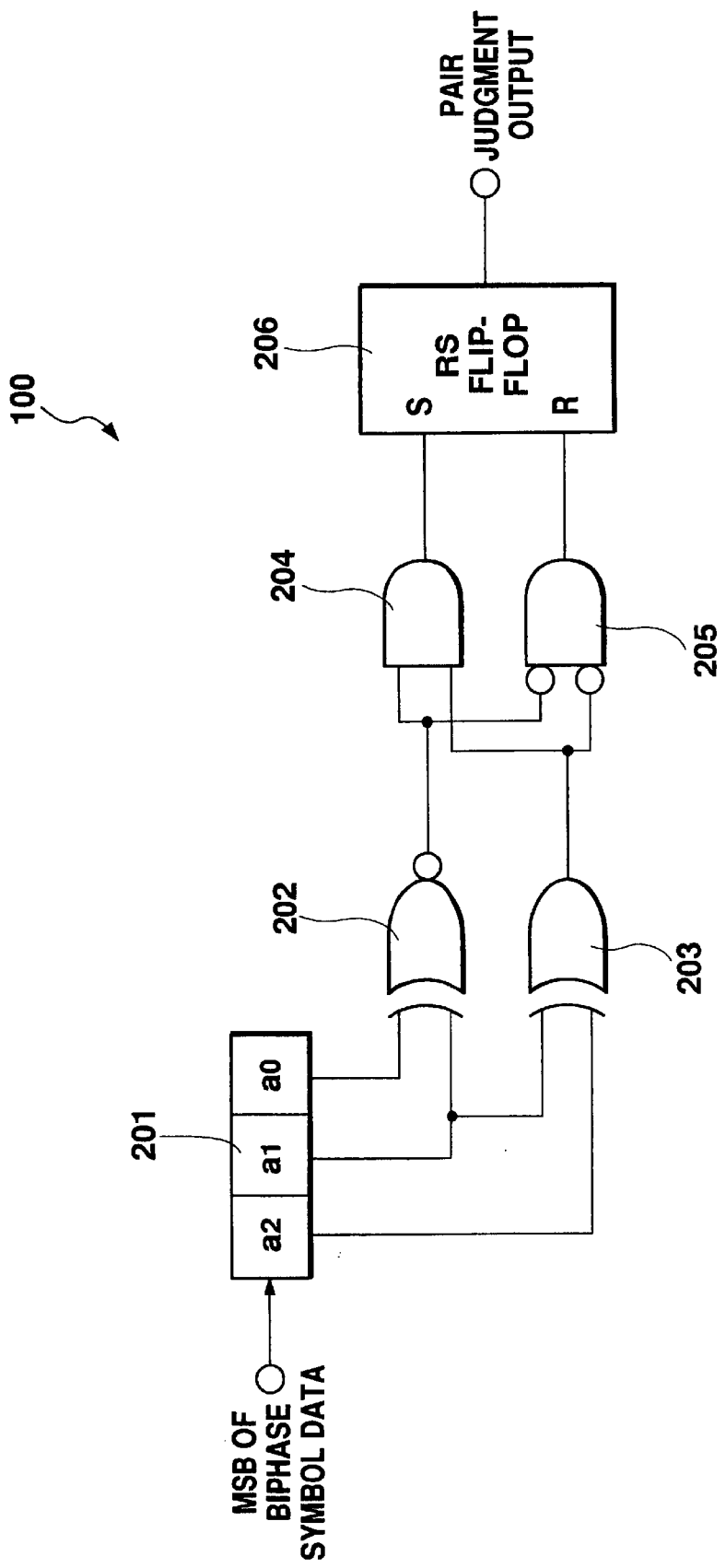
FIG. 5 is a circuit diagram showing a configuration of a pair judgment circuit.

The pair judgment circuit 100 is constructed as shown in FIG. 5. The most significant bit (MSB) of the sequentially input biphase symbol data is supplied to a shift register 201. MSBs a0, a1, a2 of the three consecutive biphase symbol data D0, D1, D2 are compared every two bits. Among the bits a0, a1, and a2 in the shift register 201, if a0 and a1 are exactly the same, an EXNOR circuit 202 outputs 1. If a1 and a2 are not the same, an EXOR circuit 203 outputs 1. Based on these 1s, an AND circuit 204 outputs 1 and an RS flip-flop circuit 206 is set and outputs 1. D1 and D2 are then judged to be a pair. If a0 is different from a1, the output from the EXNOR circuit 202 is 0. If a1 is the same as a2, the output from the EXOR circuit 203 is 0. Based on these 0s, an NOR circuit 205 outputs 1. The RS flip-flop 206 is reset and outputs 0. D0 and D1 are then judged to be a pair. As the pair judgment circuit, another circuit such as described in Japanese Patent Application No. Hei6-172682 filed by the applicant of the present invention can be used.

A configuration of the RDS-ID detector circuit 14 will now be explained in detail.

Figure 7:
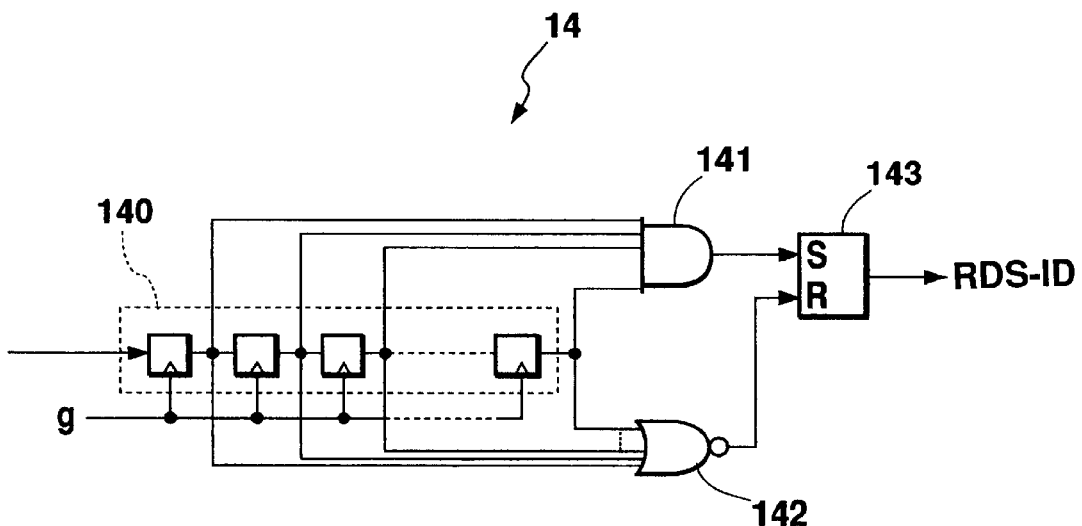
FIG. 7 is a circuit diagram showing a configuration of an RDS-ID detector circuit.

The RDS-ID detector circuit 14 is constructed as shown in FIG. 7. Judgment data from the D-FF 16 is supplied to shift registers 140 of n-steps. Shift procedure is performed on the shift registers 140 for every data, using the data clock signals (g) output from the data clock regenerator circuit 10. Output from each register is supplied to both an AND circuit 141 and a NOR circuit 142. Output from the AND circuit 141 is supplied to a set terminal of an RS-FF143, while output from the NOR circuit is supplied to a reset terminal of the RS-FF143. As a result, RDS-ID signals are obtained. Only if differential results exceed a control data level in all bits of n-bit data, i.e., a case of a biphase pair, are the RDS-ID signals supplied to show that the received signals are RDS signals. On the other hand, if the differential results do not exceed the control data level in all n bits, i.e., a case of biphase data which do not form a pair, the RDS-ID output should be reset. By this procedure, detection conditions for RDS-ID signals become tighter. Once the RDS-ID signals are detected, they are cancelled only when the received signals are absolutely judged not to be RDS signals.

Figure 8:
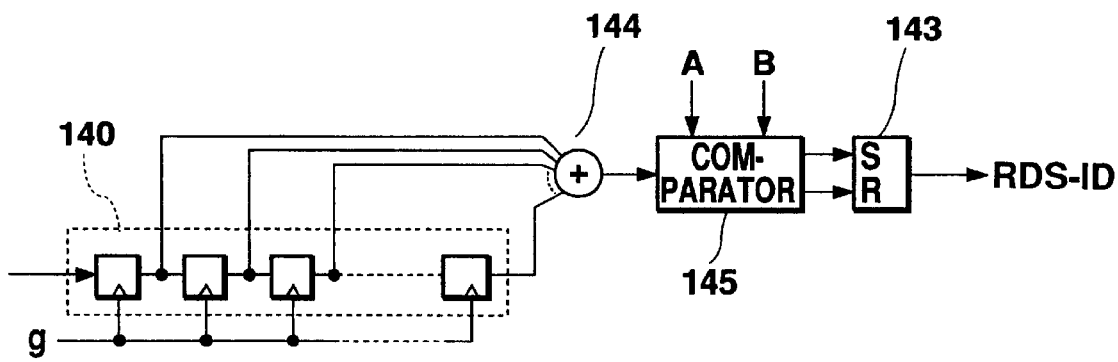
FIG. 8 is a circuit diagram showing another configuration of an RDS-ID detector circuit.

Another example of an RDS-ID detector circuit is shown in FIG. 8. Output from the n-step shift registers 140 is added by an adder 144, and the addition result is supplied to a comparator 145. In the comparator 145, based on predetermined values A, B (A>B) supplied from an external source, a set signal is supplied to the RS-FF 143 if the addition result exceeds A. If the addition result is smaller than B, a reset signal is supplied to the RD-FF 143. In this way, the RDS-ID signal is supplied when more than the predetermined number of bits among the n bits satisfy the biphase pair conditions. If less than the predetermined number of bits among the n bits satisfy the biphase pair conditions, output of the RDS-ID signal is reset. In other words, detection of RDS-ID signals has a hysterisis characteristic.

In the above two examples, detection of RDS signals is performed based on the judgment data from the data judgment circuitry 15. However, it is also possible to judge RDS signals based on the stability of output from the pair judgment circuit 100 in the data clock regenerator circuit 10.

Figure 9:
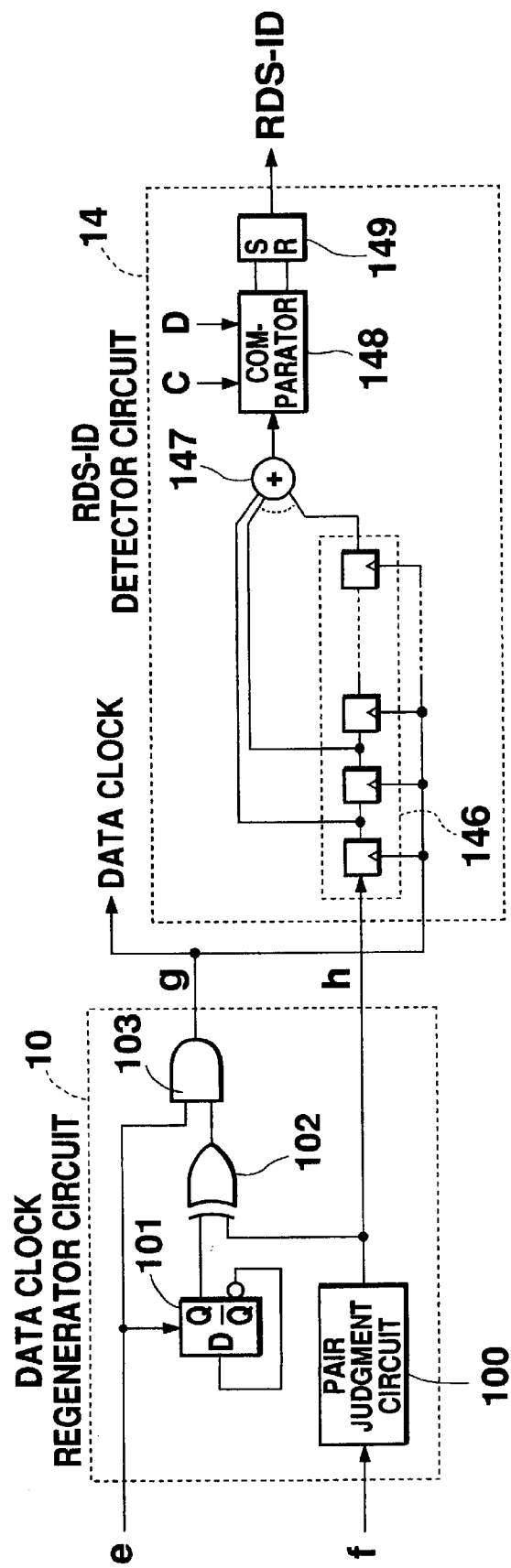
FIG. 9 is a block diagram showing another embodiment of the present invention.

As shown in FIG. 9, output (h) from the pair judgment circuit 100 in the data clock regenerator circuit 10 is supplied, instead of output from the D-FF 16 in FIG. 1, to the RDS-ID detector circuit 14 which has the same configuration as shown in FIG. 8.

Output (h) from the pair judgment circuit 100 in the data clock regenerator circuit 10 is supplied to shift registers 146 of n-steps which perform shift procedure, and output from each register is added by an adder 147. Output from the adder 147 is compared by a comparator 148 with predetermined values C,D (C<D) set by an external source. If the addition result is equal to or smaller than C or equal to or greater than (n−C), a set signal is supplied to an RS-FF149. If the addition result is equal to or greater than D and equal to or smaller than (n−D), a reset signal is supplied to the RS-FF 149.

The pair judgment circuit 100, as described above, judges pairs of biphase symbol data which are sequentially input. The circuit is configured so that output is at level 1 in the case of biphase symbol data being paired as (D1, D2), (D3, D4) . . . , and at level 0 in the case of biphase symbol data being paired as (D0, D1), (D2, D3) . . . Therefore, the pair judgment circuit 100 always outputs 1 or 0 as long as RDS signals are supplied. As a consequence, output of n-bit addition from the adder 147 should be 0 or closer to n if RDS signals were supplied. If input signals were not RDS signals, n-bit addition result tends to be a medium value between 0 and n.

Therefore, when the addition result is compared by the comparator 148 with the predetermined values as described above, RDS-ID signals are output if the predetermined number of bits among n bits satisfy biphase pair conditions. If the number of bits which satisfy the biphase pair conditions is smaller than the predetermined number of bits, RDS-ID signal output is reset. Judgment of RDS signals can be performed as described above.

It is possible to tighten or loosen RDS-ID detection conditions by changing the control data P, the predetermined values A,B,C,D, and the bit length n of the shift registers 140 and 146. The detection conditions are tightened if the control data P, the predetermined values A, B, and the register length n are set to be greater and the predetermined values C and D are set to be smaller. Especially, when a first RDS-ID signal after station selection is detected, it is better to be set detection conditions are tighter in order not to select non-RDS stations. The RDS-ID signal is controlled so as not to be reset easily, once it has been set. Therefore, it is better to reset the RDS-ID signal when a station is selected or forced synchronization reset is performed, in order not to continue a state before station selection.

While there have been described what are at present considered to be preferred embodiments of the invention, it will be understood that various modifications can be made thereto, and it is intended that the appended claims cover all such modifications as fall within the true spirit and scope of the invention.

What is claimed is:

1. An RDS demodulator, comprising:
   a demodulator circuit for demodulating biphase signals from received signals;
   an RDS signal demodulator circuit receiving output from said demodulator circuit to output RDS signals;
   a judgment circuit, to which the demodulated biphase signals are supplied, for judging whether the biphase signals forming a pair are inverted with respect to each other within each pair; and
   an RDS signal detector circuit for receiving an output from the judgment circuit to detect whether the received signals are RDS signals, wherein the RDS signal detector circuit determines receipt of an RDS signal and outputs an identification signal when an output from the judgment circuit satisfies a predetermined condition.

2. The RDS demodulator as claimed in claim 1, wherein the RDS signal detector circuit outputs the identification when it detects the inversion of the biphase signals for a predetermined period, and reset an output of the identification signal when it does not detect the inversion of the biphase signals for the predetermined period.

3. The RDS demodulator as claimed in claim 1, wherein the RDS signal detector circuit outputs the identification signal when the inversion of the biphase signals is detected at more than a first ratio during a predetermined period, and resets the output of the identification signal when the detected inversion of the biphase signals is equal to or lower than a second ratio smaller than the first ratio during the predetermined period.

4. The RDS demodulator as claimed in claim 1, wherein the judgment circuit comprises:
   a subtraction circuit which performs subtraction on signal levels of the biphase signals forming a pair; and
   data judgment circuitry which judges the pair-forming biphase signals to be inverted when an absolute value of a differential result is greater than a predetermined value.

5. An RDS demodulator comprising:
   a demodulator circuit for demodulating biphase signals from received signals;
   a pair judgment circuit to which the demodulated biphase signals are supplied, which judges biphase signals to be paired, and which generates an output signal of a first or second level, based on a combination of the pairs; and
   a detector circuit which judges whether the output signal from the pair judgement circuit is stable for a predetermined length period;
   wherein judgement of whether the received signals are RDS signals is performed based on an output from the detector circuit.

6. The RDS demodulator as claimed in claim 5 wherein the detector circuit comprises:
   an adder which adds output signal from the pair judgment circuit for a predetermined period;
   a comparator which compares an addition result with a first predetermined value C and with a second predetermined value D greater than C, and which outputs an identification signal when the addition result is equal to or smaller than C or equal to or greater than 'n–C' with n being a maximum of the output from the adder for the predetermined period, and which resets the identification signal when the addition result is equal to or greater than D and equal to or smaller than 'n–D'.

7. An RDS demodulation method, comprising:
   demodulating biphase signals from received signals;
   judging whether the demodulated biphase signals forming a pair are inverted with respect to each other within each pair; and
   detecting whether the received signals are RDS signals based on the result of the judging step by outputting an identification signal.

8. The RDS demodulation method as claimed in claim 7, wherein the detecting step comprises:
   detecting whether the inversion of the biphase signals is present for a predetermined period;
   outputting the identification signal if the inversion of the biphase signals is present for the predetermined period; and
   resetting an output of the identification signal if the inversion of the biphase signals is not present for the predetermined period.

9. The RDS demodulation method as claimed in claim 7, wherein the detecting step comprises:
   detecting whether the inversion of the biphase signals is present at more than a first ratio during a predetermined period;
   outputting the identification signal if the inversion of the biphase signals is present at more than the first ratio during the predetermined period; and
   resetting an output of the identification signal if the inversion of the biphase signals is present at or below a second ratio during the predetermined period, the second ratio being lower than the first ratio.

10. The RDS demodulation method as claimed in claim 7, wherein the judging step comprises:
    performing subtraction signal levels of the biphase signals; and
    determining the pair-forming biphase signals to be inverted when an absolute value of a differential result is greater than a predetermined value.

11. An RDS demodulation method, comprising:
    demodulating biphase signals from received signals;
    judging whether the demodulated biphase signals are paired to generate a pair judgment output signal of a first or a second level based on a combination of the pairs;
    detecting whether the pair judgment output signal is stable for a predetermined period; and
    determining whether the received signals are RDS signals based on the result of the detecting step.

12. The RDS demodulation method as claimed in claim 11, wherein the detecting step comprises:
    adding output signal from the pair judgment output signal for the predetermined period to generate an addition result;
    comparing the addition result with a first predetermined value C and with a second predetermined value D greater than C;
    outputting an identification signal when the addition result is equal to or smaller than C or equal to or greater than 'n–C', n being a maximum of the addition result for the predetermined period; and
    resetting the identification signal when the addition result is equal to or greater than D and equal to or smaller than 'n–D'.

* * * * *